US005970815A

United States Patent [19]

Buerger

[11] Patent Number: 5,970,815

[45] Date of Patent: Oct. 26, 1999

[54] SHIFTING ARRANGEMENT FOR A CHANGE GEAR TRANSMISSION

[75] Inventor: Hans Buerger, Esslingen, Germany

[73] Assignee: DaimlerChrysler AG, Germany

[21] Appl. No.: 09/159,458

[22] Filed: Sep. 24, 1998

[30] Foreign Application Priority Data

Sep. 24, 1997 [DE] Germany .......................... 197 42 065

[51] Int. Cl.$^{6}$ .................................................... B60K 20/00

[52] U.S. Cl. .......................................................... 74/473.24

[58] Field of Search .............................. 74/473.26, 337.5

[56] References Cited

U.S. PATENT DOCUMENTS

| | | | |
|---|---|---|---|
| 1,175,563 | 3/1916 | Schlatter | 74/473.24 |
| 2,690,684 | 10/1954 | Stemler | 74/473.24 |
| 3,312,119 | 4/1967 | Heald | 74/473.24 |
| 3,495,473 | 2/1970 | Willis | 74/473.24 |
| 4,320,670 | 3/1982 | Kawamoto | 74/473.24 |
| 4,543,846 | 10/1985 | Inui et al. | 74/473.24 |
| 4,570,981 | 2/1986 | Hiraiwa et al. | 74/473.24 |
| 4,601,214 | 7/1986 | Fukuchi | 74/473.24 |
| 5,309,785 | 5/1994 | Knape | 74/473.24 |
| 5,704,251 | 1/1998 | Alber et al. | 74/325 X |

FOREIGN PATENT DOCUMENTS

| | | |
|---|---|---|
| 0 532 924 A2 | 12/1993 | European Pat. Off. . |
| 36 02 157 A1 | 7/1987 | Germany . |
| 42 42 456 C2 | 11/1995 | Germany . |
| 44 43 523 C1 | 5/1996 | Germany . |

*Primary Examiner*—Charles A Marmor
*Assistant Examiner*—Ha Ho
*Attorney, Agent, or Firm*—Evenson, McKeown Edwards & Lenahan, P.L.L.C.

[57] ABSTRACT

A shifting arrangement of a change gear transmission has shift rods which are not engaged with a shift finger arranged immovably with respect to a shifting shaft disposed in a housing in a rotationally and axially displaceable manner and which are fixed by a pertaining blocking member of a block support part which engages in a form-locking member in their shifting groove. The block support part is rotationally movably and axially non-displaceably disposed on the shifting shaft and with respect to the housing is arranged in an axially displaceable and non-rotatable manner.

11 Claims, 4 Drawing Sheets

II 20 13 6a 6b 6c 1 9a 5b 5c 8a 8b III III 11a 9b 21 17 4 22 11b 23 23 3 24 10 20 II 1
3
4
5b
5c
6a
6b
6c
8a
8b
9a
9b
10
11a
11b
13
17
20
21
22
23
24
II
III

SHIFTING ARRANGEMENT FOR A CHANGE GEAR TRANSMISSION

BACKGROUND OF THE INVENTION

This application claims the priority of German application No. 197 42 065.6, filed Sep. 24, 1997, the disclosure of which is expressly incorporated by reference herein.

The present invention relates to a shifting arrangement of a transmission, and more particularly, to an arrangement wherein at least two shift rods, which are aligned in parallel, are arranged in a housing in a displaceable manner in their longitudinal directions relative to one another as well as with respect to the housing and are provided with one clutch groove respectively for the engagement of a shift finger. In the neutral positions of their shift rods, the clutch grooves are aligned with one another in a selecting plane of the housing, and the shift finger, which is arranged immovably with respect to a shifting shaft disposed by means of its axis in the selection plane or in parallel to the selection plane as well as in a rotationally and axially displaceable manner in the housing, can be displaced by the shifting shaft to cause selecting movements in the selecting plane for its engagement in the clutch groove of the shift rod to be selected and to cause shifting movements in each case in a shifting plane of the housing which is situated transversely or perpendicularly to the selecting plane or approximately centrically with respect to the groove walls of the clutch groove arriving in an engagement with the shift finger.

EP 0 532 924 A2 shows a shifting arrangement for a synchronized speed change transmission of a motor vehicle, in which some forward speeds can be shifted by swinging forks, which engage in synchronizer clutches and are swivellably disposed in the transmission case. A shifting shaft is disposed in a longitudinally displaceable and rotatable manner in the transmission case parallel to the bearing axis of the swinging forks.

In order to construct this known shift mechanism at lower cost and in an operationally more reliable manner by reducing the number of component parts, this known shifting arrangement is further changed so that a shift finger is fastened to the shifting shaft which interacts with shifting lugs fastened to the swinging forks. By way of the shift finger's longitudinal displacement in the mutually aligned grooves of the shifting lugs, the gear speeds can be preselected and can be shifted by a rotation of the shift finger.

The known shift finger is surrounded by a locking bow and reaches through it. The locking bow is longitudinally guided in the axial direction of the shifting shaft, being locked in the rotating direction and resting against both faces of the hub of the shift finger. The locking bow is longitudinally guided in a guiding groove of the transmission case and is secured against a twisting. The locking bow forms a square which is closed with the exception of the passage opening for the shift finger. At this square, the concentric cross web, which connects the two radial legs, engages as a counterguide into the concentric guide groove of the transmission case.

The passage opening for the known shift finger is provided in the section of the locking bow disposed diametrically opposite the cross web with respect of the axis of the shifting shaft. The two concentric bow ends of the locking bow, which adjoin the passage opening, are constructed as a respective locking member. Because of this further change, the known locking bow forms a two-armed lever which, at a central point of its radial legs, is swivellably disposed with respect to the shifting shaft and has the locking members at the free end of its one lever arm and the counterguide at the free end of its other lever arm. Naturally such a further change is bulky and, in the case of a one-piece shifting shaft, disadvantageous with respect to the mounting, because a demounting of the locking bow is possible only after the opening-up of the connection between the shift finger and the shifting shaft.

In the known shifting arrangement shown in DE 36 02 157 A1 for change speed transmissions of motor vehicles, a shifting shaft is provided which can be rotated for preselecting shifting channels and can be axially displaced for engaging speeds and on which, by way of its hub, a shift finger is fastened and can selectively be engaged with grooves on shifting arms of shifting forks guided on the shifting shaft in order to select a shifting fork. A blocking plate guided on the shifting shaft is radially swivellable but axially fixed in order to block the not selected shifting forks with respect to a shifting movement. In order to provide a spring-loaded notched device for fixing the speed shifting position which, on one hand, avoids tolerance problems and which, on the other hand, by way of a minimum of constructional and mounting expenditures, can, in addition, provide a shifting boundary or a blocking plate fixing and a shifting boundary, the blocking plate hub in this known shifting arrangement reaches around the shift finger hub in a known manner and a cylinder projection is provided on the blocking plate hub for receiving a spring—ball notch and corresponding opposite detent indentations are constructed in the shift finger hub.

In a first embodiment of this known shifting arrangement, an axial slot is provided in the shift finger hub, opposite which a bore is arranged in the blocking plate hub. The bore receives a pin which extends radially toward the inside and which projects into the axial slot while limiting a shifting movement. In a second embodiment, a rectangular opening is provided in the shift finger hub above which a blocking slot is arranged in the blocking plate hub. This blocking slot extends in the circumferential direction, and a blocking bolt with a pin end is arranged in the transmission case. The pin end extends radially through the blocking slot as well as into the rectangular opening.

In the additional known shifting arrangement shown in DE 42 42 456 C2, a manual shifting lever is cardanically suspended in a so-called shifting dome of a shift control housing by a joint support. Thereby, the manual shifting lever can be swivelled about a swivelling axis fixed in space with respect to the shifting dome for the selection of the shift rods and about a second swivelling axis fixed in space with respect to the joint support for operating the respective selected shift rod. A block support part, which at a distance encloses the shift finger constructed in one piece with the lower end of the manual shift lever, projects from the joint support.

The block support part in this additional arrangement has, on its face situated at the same level with the shift finger, two stop cams situated on both sides of the shift finger for engaging in the shift groove of a shift rod which in each case is not selected. While the shift finger is arranged immovably with respect to the joint support by way of the pertaining uniaxial joint in the directions of the selecting plane and is swivellably movably arranged in the directions of the respective shifting plane, by way of the cardanic bearing of the manual shifting lever and the additional development of the cardan joint as a block carrier for the blocking of the not selected shift rods, this shifting arrangement requires relative large amounts of space and results in high costs.

SUMMARY OF THE INVENTION

An object of the present invention is based in essentially the improved capability of housing, for a shifting arrangement for a change gear transmission, the devices for blocking the respective not-selected shift rods in a narrow space in a manner which is advantageous with respect to the mounting.

According to the present invention, this object has been advantageously achieved by providing that the at least one blocking member is provided as a cam arranged radially with respect to the axis of the shifting shaft, and the block support part has a bearing part which can be radially placed or semimounted on the shifting shaft, on which bearing part the at least one stop cam and the at least one counterguide are constructed, and in that the bearing part is provided with the passage opening for the shift finger and the stop cams situated on both sides of the passage opening are in each case adjoined by one counterguide respectively in the direction of the longitudinal axis of the bearing part pointing away from the passage opening.

In the shifting arrangement according to the present invention, the housing-side guide parts for the fixing of the block support part are arranged in the selecting plane (thus, in an alignment with the clutch grooves of the shift rods situated in the neutral position) so that all forces transmitted by the shift rods are introduced directly by way of the stop cams on the shortest route into the case.

In the present invention, the bearing of the block support part on the shifting shaft is not loaded, whereby this arrangement can be dimensioned at reasonable cost. The block support part may, for example, be constructed as a thermoplastic injection-molded part.

The block support part of the present invention can be mounted by a simple placing or "semimounting" on the shifting shaft at reasonable cost. In the event of a repair, the block support part can be exchanged without expenditures and without any demounting of the shift finger. The space required for the blocking of the shift rods only insignificantly increases the space of the shifting arrangement existing anyhow in this area.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
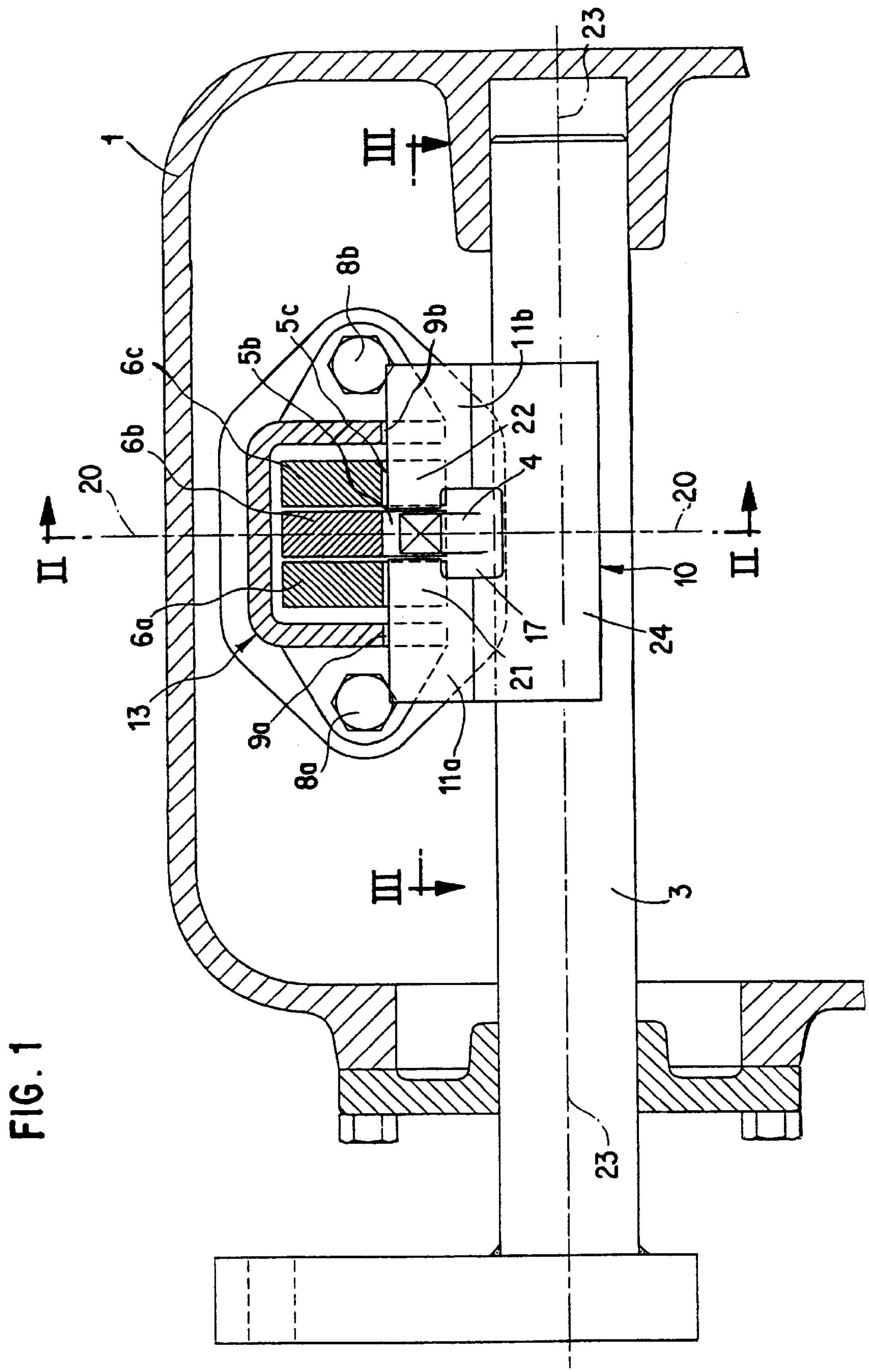
FIG. 1 is a cross-sectional view of a case of a change gear transmission having a shifting arrangement according to the present invention.
Figure 1A:
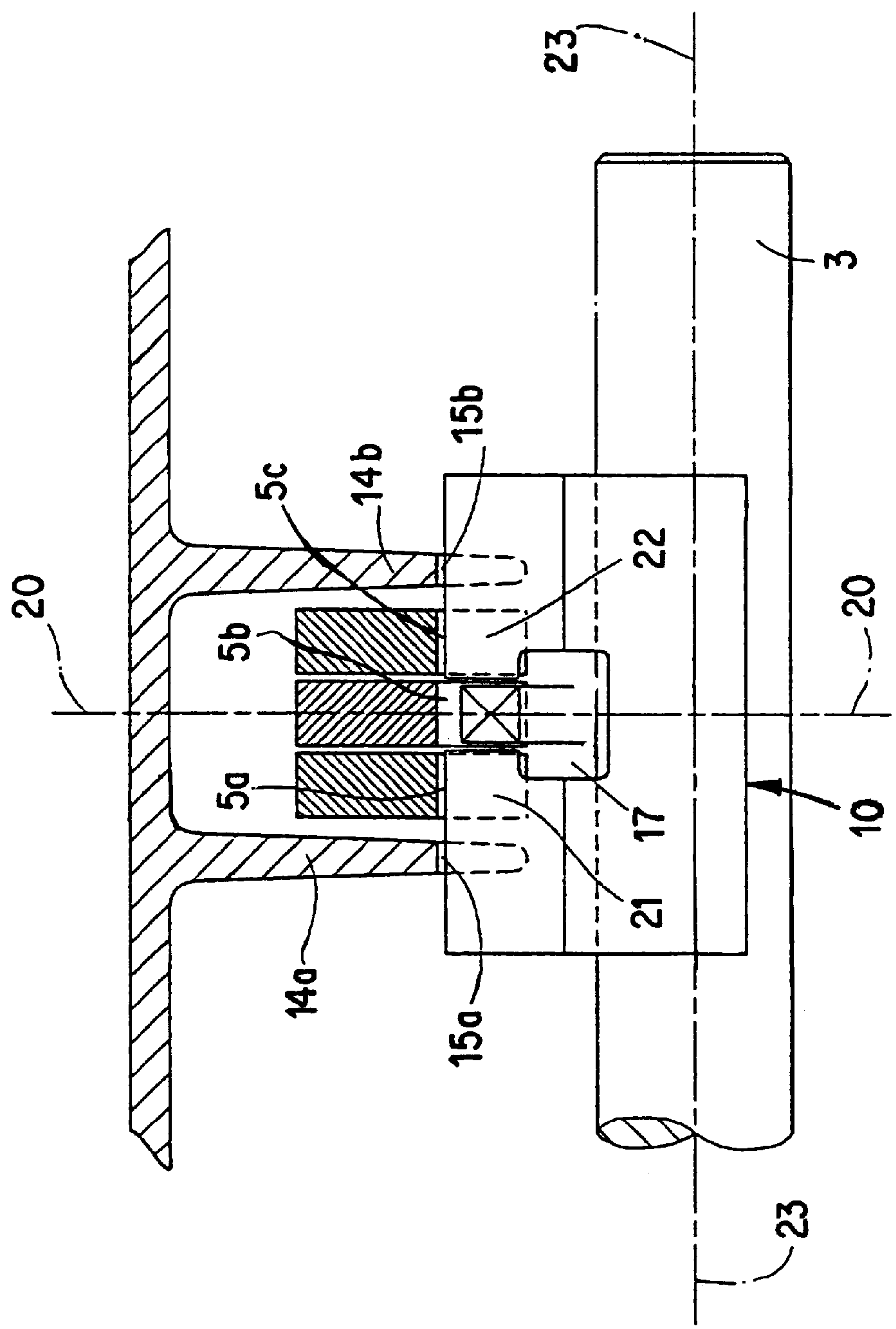
FIG. 1*a* is a partial or cutout view of a case similar to FIG. 1 but with a variation of the case-side guiding parts.
Figure 2:
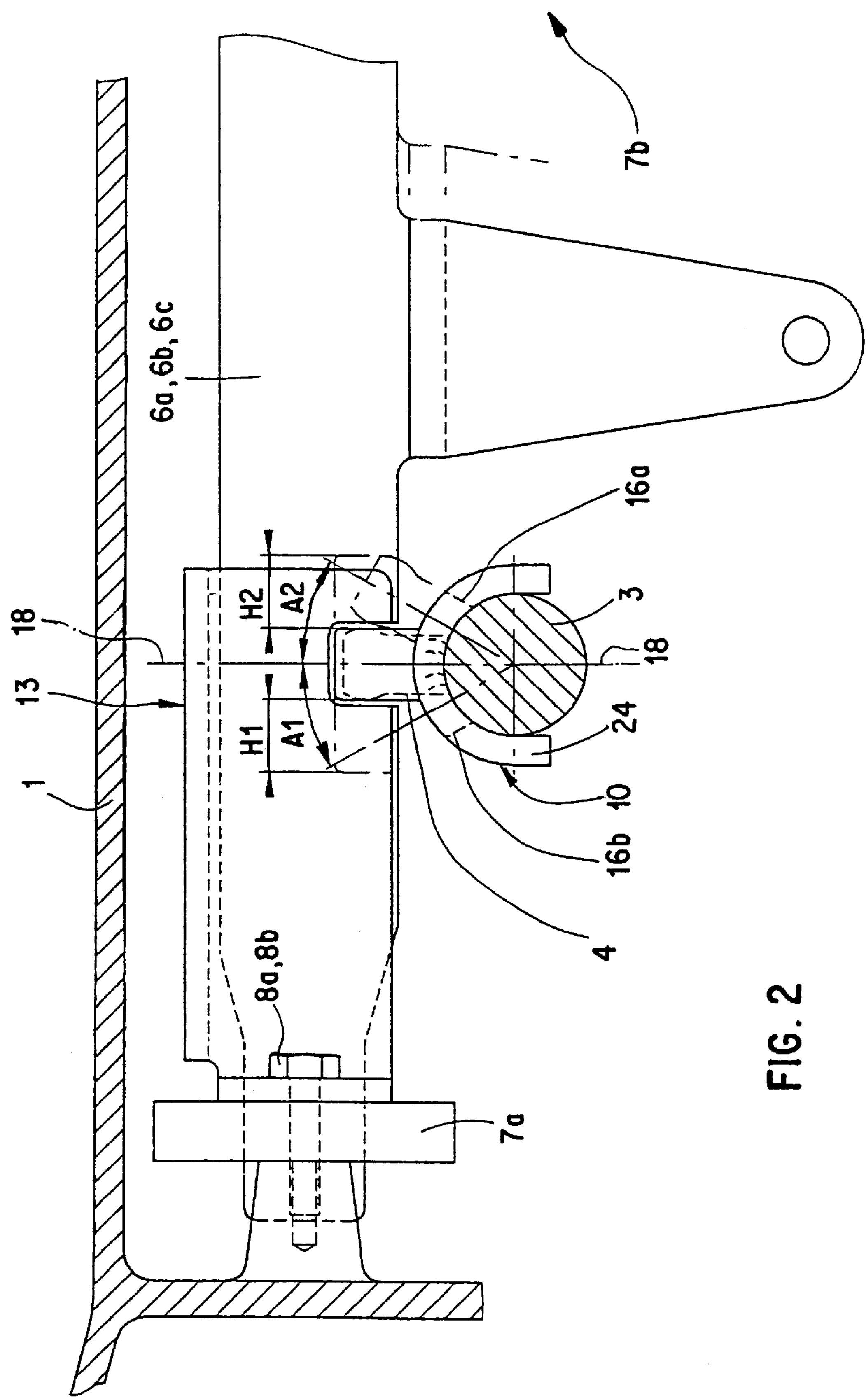
FIG. 2 is a longitudinal sectional view of the case of the change gear transmission along line II—II of FIG. 1.
Figure 3:
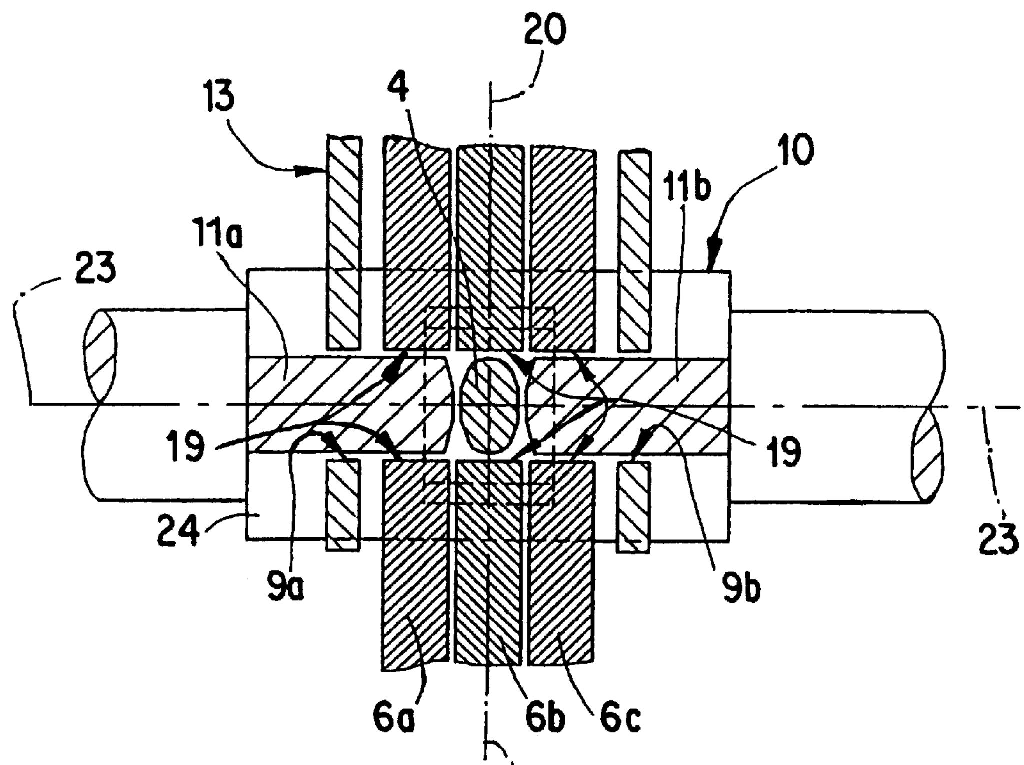
FIG. 3 is a cross-sectional view of the case of the change gear transmission along line III—III of FIG. 1.
Figure 4:
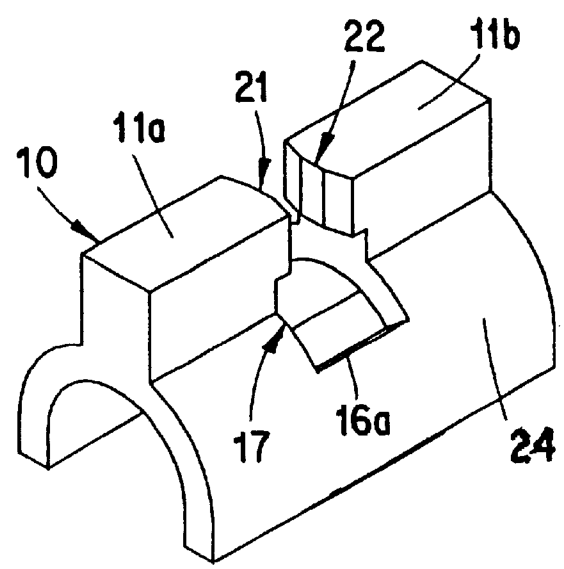
FIG. 4 is a perspective view of the block support part of the shifting arrangement of FIG. 1.

A shift finger 4 is fastened on a shifting shaft 3, which is rotationally and axially displaceably disposed in a case 1 of a change gear transmission and, with its axis 23—23, arranged transversely to known transmission shafts. The shift finger 4 selectively engages in a known manner in shifting or clutch grooves 5*a*, 5*b*, 5*c* of shift rods 6*a*, 6*b*, 6*c*. These shift rods 6*a*, 6*b*, 6*c* . . . , whose number is a function of the number of the used gearwheel clutches for the respective coupling of a gearwheel assigned to a gear ratio to its transmission shaft, are disposed in at least two bearing plates 7*a*, 7*b* which are fastened to the case 1 by screws 8*a*, 8*b*.

On the bearing plate 7*a* situated closest to the clutch grooves 5*a*, 5*b*, 5*c*, an angle part 13 is fastened by the screws 8*a*, 8*b*. The angle part 13 is configured such that a guide in the form of a guide groove 9*a* is situated on the left of the clutch groove 5*a* and a guide also in the form of a guide groove 9*b* is situated on the right of the clutch groove 5*c*. The guide grooves 9*a*, 9*b* of the angle part 13 are arranged to be aligned with and in the center with respect to a selecting plane 18—18 of the case 1 containing the axis 23—23. In the selecting plane 18—18 the clutch grooves 5*a*, 5*b*, 5*c* are also aligned when the shift rods 6*a*, 6*b*, 6*c* are in their neutral position.

On the shifting shaft 3, a block support part 10 is disposed by way of its sleeve-shaped or shell-shaped bearing part 24 such that two blocking members provided on both sides of the shift finger 4, which are constructed in the shape of stop cams 21, 22 projecting radially with respect to the axis 23—23 from the bearing part 24, engage form-lockingly in the left clutch groove 5*a* or in the right clutch groove 5*c* when the shift finger 4 is in the clutch groove 5*b* of the central shift rod 6*b*.

Simultaneously, two counterguides in the form of guide cams 11*a*, 11*b*, which each adjoin one of the two stop cams 21, 22 in the direction of the axis 23—23 pointing away from the shift finger 4 and project radially with respect to the axis 23—23 from the bearing part 24, engage in the relevant one of the two guide grooves 9*a* or 9*b*, specifically movably in the directions of the axis 23—23, but immovably in the circumferential directions of the axis 23—23.

In this manner, the shift finger 4 can operate the central shift rod 6*b* in the direction of the pertaining shifting plane 20—20, while the two other shift rods 6*a*, 6*b* are immovably fixed with respect to the case 1.

The boundary walls 19 used for the engagement of the shift finger 4 allows the clutch grooves 5*a*, 5*b*, 5*c* to be each arranged in the center with respect to the selecting plane 18—18 when its associated shift rod is in the neutral position.

The block support part 10 has, on its center point relative to its longitudinal direction, a passage opening 17 which is adjoined by the stop cams 21, 22 in each case constructed in one piece with an adjacent guide cam 11*a*, 11*b*. The surfaces 16, 16*c* of the bearing part 4 bounding the passage opening 17 in the circumferential directions of the axis 23—23 are used as stops for the shift finger 4 for limiting the shifting paths of the shift rods 6*a*, 6*b*, 6*c*.

Despite the bearing of the block support part 10, which is open in the downward direction, the shift finger 4 cannot fall out because it is fixedly held in position by way of its stop cams and guide cams 21, 22; 11*a*, 11*b* in each direction. Unacceptable shifting forces of the shift rods 6*a*, 6*b*, 6*c* or of two shift rods simultaneously are diverted by way of the guide cams 11*a*, 11*b* along the shortest route by way of the guide grooves 9*a*, 9*b* to the angle part 13. Instead of the angle part 13, two case ribs 14*a*, 14*b* may also be provided with corresponding guide groove 15*a*, 15*b*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Shifting arrangement for a change gear transmission, comprising at least two parallel shift rods displaceably arranged in a housing relative to one another in a longitudinal direction as well as with respect to the housing and provided with one clutch groove, respectively, for engagement of a shift finger, wherein, in neutral positions of the respective shift rods, the clutch grooves are aligned with one another in a selecting plane of the housing, and the shift finger, which is arranged immovably with respect to a shifting shaft disposed by an axis thereof in one of the selecting plane and parallel to the selection plane as well as in a rotationally and axially displaceable manner in the housing, the shift finger being displaceable by the shifting shaft to cause selecting movements in the selecting plane for engagement thereof in the clutch groove of the shift rod to be selected and to cause shifting movements in a shifting plane of the housing which is situated one of transversely and perpendicularly to the selecting plane or approximately centrically with respect to groove walls of the clutch groove an engaging with the shift finger, wherein a block support part which has at least one form-locking blocking member for engagement into the clutch groove of a not-selected shift rod and which is rotatably and axially non-displaceably disposed on the shifting shaft, is assigned to the shift finger such that, during the selecting movements of the shift finger, the block support part arranged to be freely movable with respect to the housing and essentially immovably with respect to the shift finger is, during the shifting movements of the shift finger with respect to the housing, arranged substantially immovably with respect to the housing and substantially freely movably with respect to the shift finger, wherein the housing has a guide extending parallel to the axis of the shifting shaft and the block support part has at least one counterguide interacting with the guide and arranged radially with respect to the axis of the shifting shaft, for fixing of the at least one not-selected shift rod with respect to the housing, and wherein the block support part has a radial passage opening for the shift finger at a central point with respect to a longitudinal axis thereof, which passage opening is situated between two blocking members with respect to the longitudinal axis, wherein the at least one blocking member is at least one cam arranged radially with respect to the axis of the shifting shaft, and the block support part has a bearing part radially placeable or semimountable on the shifting shaft, at which bearing part the at least one stop cam and the at least one counterguide are provided, the bearing part is provided with the passage opening for the shift finger, and the at least one stop cam situated on both sides of the passage opening are in each adjoined by one of the at least one counterguide, respectively in the direction of the longitudinal axis of the bearing part pointing away from the passage opening.

2. Shifting arrangement according to claim 1, wherein the at least one counterguide is a guide cam arranged radially with respect to the axis of the shifting shaft.

3. Shifting arrangement according to claim 1, wherein the at least one stop cam situated at the passage opening for the shift finger is configured in one piece with an adjoining guide cam.

4. Shifting arrangement according to claim 3, wherein the at least one counterguide is a guide cam arranged radially with respect to the axis of the shifting shaft.

5. Shifting arrangement according to claim 1, wherein the surfaces of the bearing part bounding the passage opening in a circumferential direction are constructed as angle-of-rotation stops for direct contact of the shift finger.

6. Shifting arrangement according to claim 5, wherein the at least one counterguide is a guide cam arranged radially with respect to the axis of the shifting shaft.

7. Shifting arrangement according to claim 6, wherein the at least one stop cam situated at the passage opening for the shift finger is configured in one piece with an adjoining guide cam.

8. Shifting arrangement according to claim 5, wherein the passage opening for the shift finger is radial and located at a point which is central with respect to a longitudinal axis thereof, which radial passage opening is situated between two stop cams with respect to the longitudinal axis of the bearing part.

9. Shifting arrangement according to claim 8, wherein the stop cams situated on both sides of the radial passage opening are each adjoined by a guide cam in the direction of the longitudinal axis of the bearing part pointing away from the radial passage opening.

10. Shifting arrangement according to claim 8, wherein the surfaces of the bearing part bounding the radial passage opening in a circumferential direction constitute angle-of-rotation stops.

11. Shifting arrangement according to claim 10, wherein the stop cams situated on both sides of the radial passage opening are each adjoined by a guide cam in the direction of the longitudinal axis of the bearing part pointing away from the radial passage opening.

* * * * *